United States Patent [19]
Bedwell et al.

[11] 3,722,673
[45] Mar. 27, 1973

[54] STRUCTURE FOR VARYING RELATIVE POSITIONS OF CONVEYORS

[75] Inventors: Thomas Albert Bedwell, Logan, Utah; Bobby Dwayne McWhirt, Hesston, Kans.

[73] Assignee: Hesston Corporation, Hesston, Kans.

[22] Filed: Jan. 11, 1972

[21] Appl. No.: 217,026

[52] U.S. Cl. ...................... 209/73, 209/114, 171/18
[51] Int. Cl. .............................................. B07c 9/00
[58] Field of Search .......... 209/114, 117, 73; 198/88; 171/18

[56] References Cited

UNITED STATES PATENTS

| | | | |
|---|---|---|---|
| 3,422,953 | 1/1969 | Gates et al. | 209/114 X |
| 3,455,447 | 7/1969 | Bucher | 209/114 |
| 3,469,677 | 9/1969 | Schultz | 209/114 X |

*Primary Examiner*—Allen N. Knowles
*Attorney*—Schmidt, Johnson, Hovey and Williams

[57] ABSTRACT

Structure is provided for varying the relative positions of certain of a series of conveyors in a potato harvesting machine. A vertically shiftable discharge end of a potato-receiving side conveyor in the nature of an elevator is operably connected with a transversely inclined, tiltable trash conveyor such that as the trash conveyor is tilted to maintain it at a predetermined angle of transverse inclination during ascent and descent of the harvester over uneven terrain the discharge end of the elevator is automatically raised and lowered. The connection itself is of such nature that the extent of gravitation of the potatoes from the elevator to the trash conveyor is kept at a minimum at all angles of inclination of the trash conveyor to avoid bruising of the potatoes. Thus, the proper angle of inclination of the trash conveyor may be maintained so that the potatoes will separate from dirt, clods, rocks and vines picked up by the elevator without danger of damage as the potatoes drop onto the trash conveyor. A front, bulk loading conveyor, disposed to receive the potatoes as they roll laterally from the trash conveyor, serves as an articulated support for the trash conveyor.

13 Claims, 3 Drawing Figures

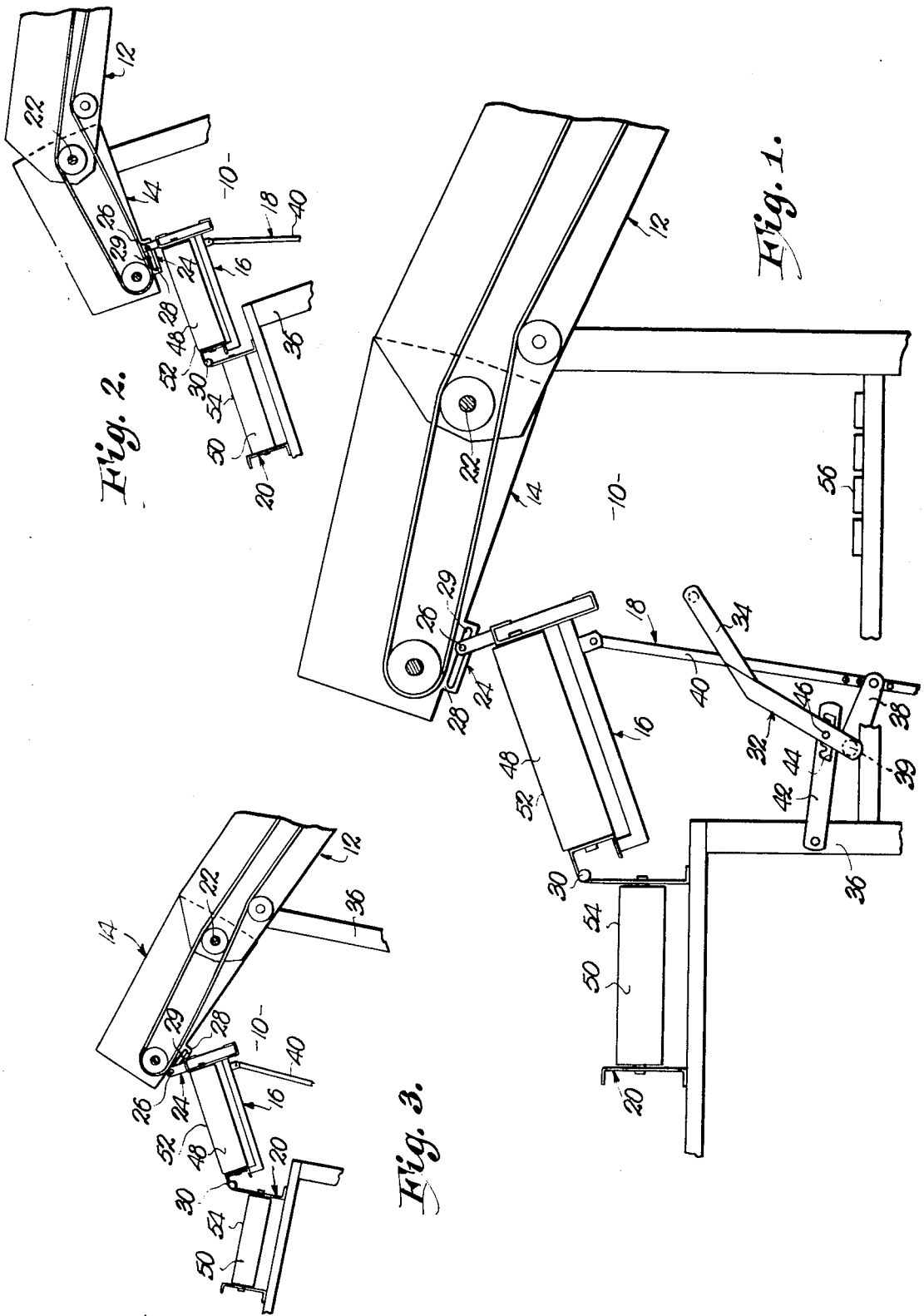

STRUCTURE FOR VARYING RELATIVE POSITIONS OF CONVEYORS

This invention relates to a potato harvester having a series of conveyors which transfer the potatoes from the ground to a boxing, sacking or packaging station or to a hauling vehicle. Usually, a large amount of refuse in the form of clods, dirt, rocks and vines elevated with the potatoes must be separated during the transfer operations. This separation is accomplished in part through use of a transversely inclined, tiltable trash conveyor which is positioned at an angle steep enough to cause the potatoes to roll transversely therefrom onto a loading conveyor as the refuse is discharged laterally by the trash conveyor. The extent of gravitation of potatoes from one conveyor to another is critical in that it is directly related to the bruising incurred by the potatoes during such transfer. If the harvester were always used on relatively flat terrain, the conveyors could be positioned relative to one another to position the lateral trash conveyor at a proper fixed inclination to obtain maximum separation of the potatoes from the refuse while at the same time maintaining a minimal distance of gravitation of the potatoes from one conveyor to another. However, since the harvester is used on uneven terrain, as the machine ascends and descends slopes, the angle of inclination of the trash conveyor changes, thus adversely affecting its separating efficiency. A mere change in the angle of inclination from time to time creates the problem of also changing the relative positions of the conveyors to the extent that the gravitation between conveyors increases, causing undesirable bruising of the potatoes.

It is, therefore, an important object of the present invention to provide structure for varying the relative positions of a series of conveyors in such a manner that, as the material passes from one conveyor to another, maximum separation of the crop and refuse is achieved without inflicting damage to the crop as by bruising.

It is a further important object of the invention to provide structure which maintains the extent of gravitation of materials between conveyors at a predetermined minimum at all angles of inclination of the conveyors.

It is a further important object to provide structure for maintaining certain of the conveyors at predetermined angles of inclination as the machine ascends and descends uneven terrain without undue damage to the crop.

It is another important object of my invention to provide apparatus that simultaneously controls the shifting and tilting of certain conveyors relative to one another.

In the drawing:

FIG. 1 is a fragmentary, schematic, side elevational view of a potato harvesting machine, illustrating the structure for varying the relative positions of conveyors made pursuant to the present invention, and showing the relationship and angles of inclination of the conveyors when the machine is on level terrain;

FIG. 2 is a fragmentary view similar to FIG. 1, on a reduced scale, showing the relationship and angle of inclination of the conveyors when the machine is in a descending path of travel; and FIG. 3 is a fragmentary view similar to FIG. 2, also on a reduced scale, showing the relationship and angle of inclination of the conveyors when the machine is in an ascending path of travel.

A materials handling assembly broadly designated by the numeral 10 and which may constitute a portion of a machine for harvesting crops, such as potatoes, is provided with a first conveyor 12 in the nature of a longitudinal, side elevator having a vertically shiftable discharge end 14. A second, lateral, transversely inclined, tiltable refuse or trash conveyor 16 is disposed to receive all of the materials gravitating from discharge end 14. Structure 18 is provided for simultaneously shifting the discharge end 14 and tilting the conveyor 16, while at the same time maintaining the latter in a materials-receiving relationship to end 14. A lateral loading conveyor 20 is disposed along the lower longitudinal edge of and parallel to the conveyor 16 for receiving the separated crop as it emanates transversely from conveyor 16 and as the trash is discharged by the conveyor 16 at one end of the latter. Discharge end 14 is shiftable vertically about the normally horizontal axis of a shaft 22.

Structure 18 includes a lost motion mechanism 24 interconnecting end 14 and conveyor 16 at the upper longitudinal edge of the latter, located beneath end 14. Mechanism 24 includes a moving pivot in the nature of a rod 26, carried by a pair of spaced-apart brackets 28 (only one of which is shown), each provided with an elongated slot 29 and each affixed to the lower face of discharge end 14. Rod 26 is parallel with the axis of shaft 22 and is movable along the slots 29 toward and away from the shaft 22, thereby articulating conveyor 16 and discharge end 14. Conveyor 16 is tiltably supported by conveyor 20 at the lower edge of conveyor 16 and at the proximal longitudinal edge of conveyor 20 by an elongated hinge 30 having its axis of articulation parallel with rod 26.

Structure 18 is further provided with apparatus 32 coupled with conveyor 16 for effecting a simultaneous shifting of discharge end 14 and tilting of conveyor 16. Apparatus 32 includes a lever 34 swingably carried by framework 36 of assembly 10. A rocker arm 38 rigidly affixed to lever 34 or its pivot pin 39 for vertical movement therewith is adjustably attached to a link 40 which pivotally interconnects arm 38 and conveyor 16. A latch 42, swingable on framework 36 and having a notched slot 44 therein, cooperates with a laterally extending pin 46 on lever 34 for maintaining the latter in selected positions.

Conveyors 16 and 20 are provided with endless chains 48 and 50 respectively. Chain 48 is positioned with respect to the sides of conveyor 16 so that its load-carrying stretch 52 extends thereabove. Chain 50, on the other hand, is so carried by conveyor 20 that its load-carrying stretch 54 is somewhat below the top edge of the conveyor 20 sides for containing the materials thereon.

In operation, as the machine moves forwardly from right to left, viewing FIGS. 1–3, the material received by conveyor 12 (such as potatoes, dirt, rocks, clods and vines) is elevated and carried forwardly by conveyor 12 and dropped from its discharge end 14 onto the laterally moving stretch 52 of chain 48 of conveyor 16. The transverse, downward and forward inclination of conveyor 16 causes the potatoes to roll onto stretch 54 of chain 50 of conveyor 20 for lateral movement thereby, while the refuse remaining on chain 48 is carried laterally by stretch 52 and dropped from one end of conveyor 16.

FIG. 1 shows the attitudes and relative positions of conveyors 12, 16 and 20 and the discharge end 14 when the harvester is operating on level terrain. Structure 18 is utilized through the moving of lever 34 to simultaneously shift discharge end 14 and tilt conveyor 16 to position the latter for optimum potato separation therefrom while at the same time limiting the extent of gravitation of the crop from discharge end 14 to a predetermined minimum. It has been found that potatoes separate from the refuse best if they are allowed to gravitate laterally from conveyor 16 along a slope of approximately 20° to 30° from horizontal. The shifting and tilting is accomplished by the action of apparatus 32 which causes conveyor 16 to tilt about hinge 30, while at the same time the lost motion mechanism 24 causes discharge end 14 to shift about shaft 22.

As the machine commences to move downhill toward the position shown in FIG. 2, causing conveyor 20 to tilt, and effecting a steeper slope in conveyor 16, it becomes necessary to reposition conveyor 16 in order to prevent an undue amount of refuse from discharging to conveyor 20. An operator standing on platform 56 need merely unlock latch 42 and shift the lever 34 clockwise to lower the link 40 and pull the conveyor 16 downwardly about hinge 30. This causes conveyor 16 to assume the same proper angle of inclination in FIG. 2 as in FIG. 1. Conversely, as the machine starts to move uphill, lever 34 may be moved forwardly to raise the rear edge of conveyor 16, as shown in FIG. 3, such as to again cause its angle of inclination to be the same as in FIG. 1, steep enough to cause the potatoes to gravitate properly to conveyor 20.

Thus, while the angle between conveyors 16 and 20 changes each time lever 34 is actuated, more importantly is the action which takes place in discharge end 14. Manifestly, these alterations in the positions of conveyor 16 are height changes. If discharge end 14 were not swingable, and were held in the position shown in FIG. 3, then the gravitational distance to conveyor 16 would progressively increase as the attitude of the conveyor 16 is changed by use of lever 34 from that shown in FIG. 3 to that shown in FIG. 2. The increased distance of potato gravitation would, accordingly, cause substantial damage as the potatoes fall onto conveyor 16.

Discharge end 14 must, therefore, be lowered as the rear edge of conveyor 16 is lowered and, as noted in FIGS. 2 and 3, the distance of gravitation actually decreases as conveyor 16 and discharge end 14 are lowered simultaneously to the positions shown in FIG. 2. On the other hand, if the pivot rod 26 were held against movement in slots 29, then the distance of potato gravitation would be excessive during repositioning of conveyor 16 for uphill travel of the machine. Instead, as the rear edge of conveyor 16 is raised about hinge 30 from the position shown in FIG. 2 to that shown in FIG. 3, rod 26 not only provides the necessary pivot but it slides from the rear ends to the front ends of slots 29. This minimizes the amount of lift imparted to the discharge end 14 as lever 34 is swung anticlockwise from its rearmost position to its forwardmost position and holds the extent of potato gravitation within acceptable limits.

Having thus described the invention, what is claimed as new and desired to be secured by Letters Patent is:

1. In a harvesting machine:
   an elevator for receiving a crop as it is being harvested, together with refuse picked up with the crop,
   said elevator having an upper discharge end adapted to be raised and lowered;
   a tiltable refuse handling conveyor disposed to receive and separate the crop and the refuse gravitating from said discharge end;
   a lateral loading conveyor disposed to receive the crop emanating from the tiltable conveyor transversely of the latter; and
   structure for simultaneously raising and lowering said discharge end and tilting said refuse handling conveyor to maintain the latter at a predetermined angle of transverse inclination as the machine ascends and descends uneven terrain, while maintaining the extent of gravitation of the crop at a predetermined minimum at all angles of inclination of said conveyor.

2. In a machine as claimed in claim 1, said structure including a lost motion mechanism.

3. In a machine as claimed in claim 2, said mechanism including a moving pivot responsive in its movement to said simultaneous raising, lowering and tilting.

4. In a machine as claimed in claim 3 wherein said pivot articulates the refuse handling conveyor and said discharge end.

5. In a machine as claimed in claim 4 wherein said discharge end has a normally horizontal axis about which it is shiftable and wherein said pivot is parallel with said axis and movable on the discharge end toward and away from said axis.

6. In a machine as claimed in claim 5 wherein said refuse handling conveyor is tiltably secured to said loading conveyor about an axis parallel with said pivot.

7. In a machine as claimed in claim 6 wherein said structure includes apparatus coupled with said refuse handling conveyor for effecting said simultaneous raising, lowering and tilting.

8. In a materials handling assembly:
   a first conveyor having a vertically shiftable discharge end;
   a second, transversely tiltable conveyor disposed to receive materials gravitating from said discharge end; and
   structure for simultaneously shifting said discharge end and tilting said second conveyor while maintaining the second conveyor in materials-receiving relation to said discharge end while maintaining the extent of said gravitation of the materials at a predetermined minimum at all angles of inclination of said second conveyor.

9. In an assembly as claimed in claim 8, said structure including a lost motion mechanism.

10. In an assembly as claimed in claim 9, said mechanism including a moving pivot responsive in its movement to said simultaneous shifting and tilting.

11. In an assembly as claimed in claim 10 wherein said pivot articulates the second conveyor and said discharge end.

12. In an assembly as claimed in claim 11 wherein said discharge end has a normally horizontal axis about which it is shiftable and wherein said pivot is parallel with said axis and movable on the discharge end toward and away from said axis.

13. In an assembly as claimed in claim 12 wherein said structure includes apparatus coupled with said second conveyor for effecting said simultaneous shifting and tilting.

* * * * *